United States Patent Office 2,941,363
Patented June 21, 1960

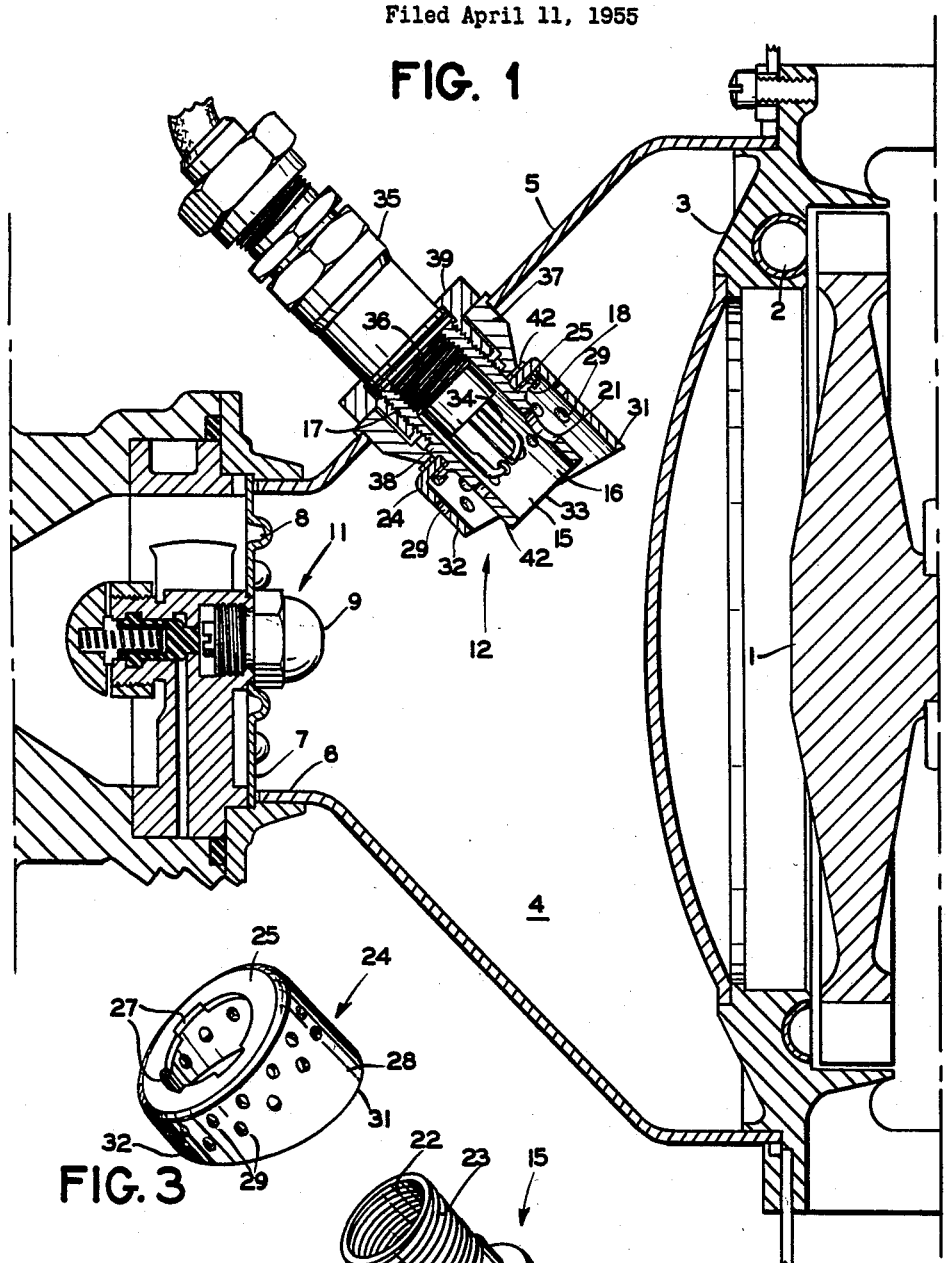

2,941,363

DUAL BAFFLED IGNITER FOR COMBUSTION CHAMBER

Richard P. Cuny, Union City, and William Dietz, Hillsdale, N.J., William D. Antrim, Jr., Eastgate, Mass., and Dennen J. Bunger, Whitesboro, N.Y., assignors to Bendix Aviation Corporation, Teterboro, N.J., a corporation of Delaware Filed Apr. 11, 1955, Ser. No. 500,538

1 Claim. (Cl. 60—39.82)

This invention is concerned with a novel and improved combustion apparatus having baffled igniter. It finds particular use in any combustion application where high velocity flows of the combustible components are present.

The combustion apparatus of the present invention is of special advantage when employed in the combustion chamber of an engine starter of the hot gas turbine type, such as is found in jet aircraft. To provide the high performance required of jet aircraft hot gas turbine engine starters, it is necessary that ignition for starting operations take place under a wide range of temperatures, from 160° F. to —65° F., as well as under high velocity flow of the combustible components. These adverse conditions have created difficulty in obtaining proper fuel component mixtures, in obtaining instantaneous combustion, and in avoiding combustion failure at low temperatures, carbonization, igniter clogging, and other harmful defects.

The combustion apparatus of the present invention is designed to provide high performance ignition functioning for starting operations under the adverse conditions of temperature variations and fuel flow mentioned.

This high performance is accomplished by an igniter assembly that includes means for retarding and slowing the velocity flow of the fuel components and for providing a highly vaporized and diffused mixture of the fuel components, whereby instantaneous ignition takes place throughout the range of temperatures previously mentioned.

A further object of the invention is, therefore, to provide a novel and improved igniter assembly in a combustion chamber, particularly a combustion chamber of a type wherein high velocity fuel component flows are present, and wherein ignition is required to take place under a wide range of temperatures.

Another object of the invention is to provide means that will retard the velocity flow of combustion fuel components to the electrodes of an igniter and will diffuse the fuel components with one another into a highly vaporized mixture.

A more particular object of the invention is to provide a novel and improved igniter assembly in a combustion chamber for a hot gas type turbine engine starter of a jet aircraft.

The invention further lies in the particular structure, organization and arrangement of the various elements thereof, as well as in their cooperative association with one another for the purposes intended.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is a sectioned view of the igniter assembly in combination with the combustion chamber of a hot gas turbine engine starter;

Fig. 2 is a perspective detail of the inner baffle member; and

Fig. 3 is a perspective detail of the outer baffle member.

In the drawings there is shown a turbine 1 that powers starter mechanism, not shown, of an associated jet aircraft engine. The turbine is of the radial impulse type, adapted to be driven by the hot gases of combustion flowing at high velocity through nozzles 2 in an injector head 3 of a fuel-air combustion chamber 4. The combustion chamber, formed by a conical shell 5, is closed over at its wider diameter end by the injector head 3. The latter provides a central domed area having various benefits; the nozzles 2 are provided in the marginal portion of the head and incline properly from the combustion chamber side toward the turbine blades for radial attack of the latter. The narrower end 6 of the combustion chamber is of relatively smaller diameter, and is closed over by an air-inlet flow plate 7, having a plurality of openings 8 through which pressurized air is fed into the chamber at high velocity from a suitable connected source. The outlet end 9 of a suitably supported fuel supply nozzle 11 projects axially through the air flow plate into the narrow end of the combustion chamber. Pressurized fuel is fed by suitably connected means, not shown, through the nozzle 11 into the combustion chamber. The nozzle issues the fuel into the chamber in a conical spray, which comingles with the pressurized air in flow. Ignition of the fuel-air mixture is effected by an electric igniter 12 which is supported in the tapered wall 5 of the combustion chamber shell. The igniter projects angularly in the combustion chamber into the path of the fuel-air flow.

The igniter assembly comprises means that baffles, retards, and slows up the velocity flow of the air-fuel mixture to the igniter electrodes; further, it breaks up the air-fuel mixture into highly diffused vaporized particles of fuel and air, whereby combustion is effected instantaneously under the attendant wide temperature ranges of operation.

The igniter assembly includes a cylindrical baffle member 15, the surface of which is divided into sections 16, 17, by a peripheral flange or lip 18 midway thereof. Section 16, just to the right of lip 18, has about it a single ring of small holes 19, uniformly spaced from one another. One of these holes, as indicated at 21, is of relatively larger size than the others. Section 17, at the other side of lip 18, is internally threaded at 22, and externally at 23. Section 17 projects out through the axial opening of a second baffle member 24, and lip 18 of member 17 limits against the inner face of a flange 25 formed about one end of member 24. Splines 26 on section 17, immediately to the left of lip 18, engage in complementary splineways 27 of flange 25 for assembly purposes and so as to prevent the one baffle member from turning with respect to the other. Section 16 of baffle member 24 is held by flange 25 in coaxial spaced relation to the surrounding wall 28 of baffle member 24. Baffle member 24 includes a staggered arrangement of holes 29 around its wall 28. These are substantially opposite the holes 19 of member 15 and are of slightly larger diameter. Wall 28 of baffle member 24 is nonsymmetrical, being angularly cut away at its free end so as to provide opposed long and short wall portions 31, 32. The longer wall part 31 extends in the manner of a scoop beyond the free end 33 of baffle member 15, while the free end of the latter extends beyond the shorter wall 32 (Fig. 1). Baffle members 15 and 24 are assembled co-axially about the electrodes 34 of a spark plug member 35, and serve, as will be later explained, to bring about fuel-air vaporization and flow conditions to enable the instantaneous ignition characteristics earlier described, of the igniter throughout the usual range of temperatures of operation of the associated craft.

Spark plug 35 is of conventional make; it includes the usual electrodes 34, and has the conventional threaded shank portion 36 enabling it to be supported in a wall of a combustion chamber.

The igniter assembly is supported by the shell 5 of the combustion chamber. To this end, the shell is fitted with a short collar or brushing element 37 which projects angularly into the combustion chamber. Through the axial opening of collar 37, the threaded end of baffle member 15 extends in such a manner that portions of the splines 26 extending beyond flange 25 are received in complementary splineways as at 38 of collar 37. The several members of the igniter assembly are held in place relative to the collar 37 and to one another by an internally threaded bushing or nut member 39. The latter is received in the outer end of collar 37 and is threaded onto section 17 of baffle member 15. By this arrangement, tightening of the bushing 39 draws and holds the several members of the igniter together. Suitable gaskets 42 are provided on either side of the baffle flange 25. Relative to the fuel nozzle outlet 9, the shorter wall portion 32 of the outer baffle member 24 is the nearest, while the scoop portion 31 is to the far side. This arrangement is desired in the operation of the device; the splines of the baffle member 15 in cooperating with the splineways of the baffle member 24 and collar 37 serve to assure this arrangement in assembling the several elements together as a unit.

In the operation of the device, pressurized fuel issues in a conical spray from nozzle 11 to the combustion chamber. Pressurized air fed into the combustion chamber through the flow plate collides and comingles with the fuel spray. The fuel-air mixture is baffled in its flow to the igniter assembly by the shorter wall portion 32 of the outer baffle member which projects into the path of the fuel spray. This serves to dampen the fuel-air flow velocity and to further mix and vaporize the flow of fuel-air components. The retarded mixture flows over the edge of the short wall 32 to strike the underside 42 of the inner baffle member 15 whereby the fuel flow is further retarded. Eddy currents are created by fuel-air components forcing their way through the holes 29 of baffle member 24. These eddy currents further develop around the inner baffle member 15 as the fuel-air components try to force through the smaller holes 19 of the latter. The retarded air-fuel mixture is further forced over the outer edge of the inner baffle to be further baffled and scooped in by the over-projecting scoop portion 31 of the outer baffle member. The scooped in mixture flows in divers directions about the inner baffle, adding to the confusion of the circulating currents and resulting in a highly intimate and diffused vaporized mixture of fuel and air. The vaporized mixture tends to escape at reduced velocity from the confusion between the baffles through the smaller holes 19 and in large volume through the large hole 21 of the inner baffle to the electrodes, where it is ignited. This combined action of baffling, slowing of flows, and flow diversion and confusion, serves to create the characteristics of a fuel-air mixture desired for instantaneous ignition throughout the range of temperatures of operation, 160° F. to −65° F. Ignition is further characterized by the fullness thereof, and by a minimum of carbonization and clogging of the igniter assembly elements.

While the combustion apparatus of the present invention has been illustrated as employed in a fuel-air combustion chamber of a jet aircraft turbine engine starter, it is understood that it is not limited to this association and may be used in other combustion applications, particularly where high velocity flows are present.

Although an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

A combustion apparatus comprised of a combustion chamber having a longitudinal axis, fuel supply means positioned on said axis at one end of said chamber for introducing a conical spray of fuel into said chamber, air supply means arranged about said fuel supply means for introducing air into said chamber, an electric igniter projecting into said chamber at an acute angle to said axis, the inner part of said igniter being spaced from said fuel supply means and so arranged that the inner part of said igniter extends into the outer part of the projected conical fuel spray, the inner part of said igniter including axial electrodes and inner and outer spaced baffle elements having open ends and coaxially surrounding said electrodes, said inner baffle element extending beyond the ends of said electrodes and having a ring of openings adjacent the ends of said electrodes, said outer baffle element extending beyond the ends of said electrodes and having two spaced rings of openings adjacent said ring of openings in said inner baffle element, said outer baffle element having an inclined inner edge, the shorter part of said inclined inner edge being adjacent said fuel supply means and terminating short of the adjacent edge of said inner baffle element, the longer part of said inclined inner edge of the outer baffle element terminating beyond the adjacent edge of said inner baffle element.

References Cited in the file of this patent

UNITED STATES PATENTS

| | | |
|---|---|---|
| 2,385,699 | Fox | Sept. 25, 1945 |
| 2,423,410 | Simmons | July 1, 1947 |
| 2,493,743 | Benson | Jan. 10, 1950 |
| 2,679,137 | Probert | May 25, 1954 |
| 2,693,082 | Arthur | Nov. 2, 1954 |

FOREIGN PATENTS

| | | |
|---|---|---|
| 621,789 | Great Britain | Apr. 20, 1949 |
| 714,596 | Great Britain | Sept. 1, 1954 |
| 727,781 | Great Britain | Apr. 6, 1955 |